United States Patent
Hwang et al.

(10) Patent No.: US 11,342,974 B2
(45) Date of Patent: May 24, 2022

(54) MULTIPLE BEAM MULTIPLE-INPUT-MULTIPLE-OUTPUT SYSTEM

(71) Applicant: Apple Inc., Cupertino, CA (US)

(72) Inventors: Yeong-Sun Hwang, Oberhaching (DE); Yuan Zhu, Beijing (CN); Yushu Zhang, Beijing (CN); Huaning Niu, San Jose, CA (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/247,416

(22) Filed: Dec. 10, 2020

(65) Prior Publication Data

US 2021/0328636 A1    Oct. 21, 2021

Related U.S. Application Data

(63) Continuation of application No. 16/082,365, filed as application No. PCT/CN2016/078444 on Apr. 5, 2016, now Pat. No. 10,868,596.

(51) Int. Cl.
*H04B 7/0456* (2017.01)
*H04B 7/06* (2006.01)
*H04B 7/08* (2006.01)
*H04B 7/0413* (2017.01)
*H04L 5/00* (2006.01)
*H04W 72/04* (2009.01)

(52) U.S. Cl.
CPC ........ *H04B 7/0486* (2013.01); *H04B 7/0413* (2013.01); *H04B 7/0617* (2013.01); *H04B 7/0626* (2013.01); *H04B 7/0639* (2013.01); *H04B 7/0695* (2013.01); *H04B 7/088* (2013.01); *H04L 5/0048* (2013.01); *H04W 72/0406* (2013.01)

(58) Field of Classification Search
CPC .. H04B 7/0486; H04B 7/0413; H04B 7/0639; H04B 7/0626; H04B 7/088; H04B 7/0695; H04B 7/0617; H04W 72/0406; H04L 5/0048
USPC ........................................................ 375/267
See application file for complete search history.

(56) References Cited

U.S. PATENT DOCUMENTS

2018/0309496 A1* 10/2018 Lee .................. H04L 5/0053
2019/0104549 A1*  4/2019 Deng ............... H04W 72/0446

* cited by examiner

*Primary Examiner* — Fitwi Y Hailegiorgis
(74) *Attorney, Agent, or Firm* — Fay Kaplun & Marcin, LLP

(57) ABSTRACT

Example embodiments are directed towards beam formation matching for communications between a receiver and transmitter in a multiple beam Multiple Input Multiple Output (MIMO) system.

17 Claims, 12 Drawing Sheets

MULTIPLE BEAM MULTIPLE-INPUT-MULTIPLE-OUTPUT SYSTEM

TECHNICAL FIELD

Example embodiments are directed to a receive beam formation logic, for use in a receiver, and a transmit beam formation logic, for use in a transmitter, for beam formation matching for communications between the transmitter and the receiver in a multiple beam Multiple Input Multiple Output (MIMO) system.

BACKGROUND

Beamforming is a signal processing technique used to control the directionality of the transmission and reception of a radio signal. This can be achieved via phased antenna arrays, whereby the signal at each array element is phase shifted so that the combined signal of an array at a particular angle is either constructively or destructively combined to induce spatial selectivity. By controlling the directional pattern of antennas, beamforming can improve signal quality at an intended receiver while reducing unintended interference to/from other directions. Thus, beamforming has found numerous applications in radar, sonar, wireless communications, radio astronomy, and acoustics. In particular, this is performed in fifth-generation (5G) wireless communication technology, whose operating bands include higher frequencies (e.g., millimeter wavebands) with unattractive attenuation characteristics.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DESCRIPTION OF EMBODIMENTS

Figure 1:
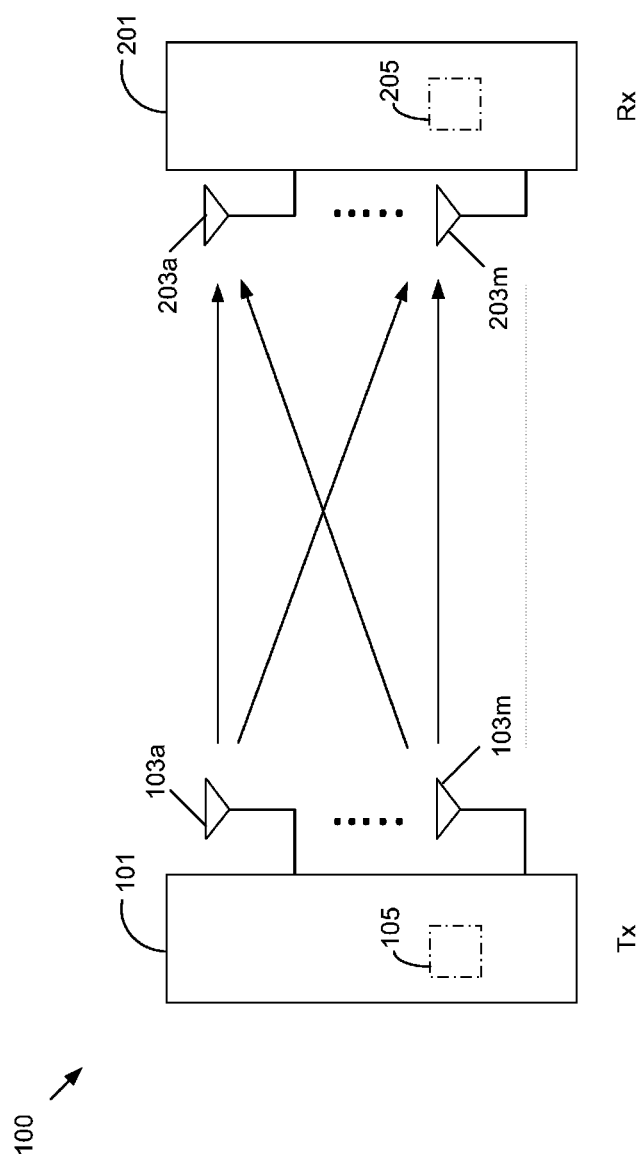
FIG. 1 is a system overview of a multiple beam MIMO system, according to some of the example embodiments.

In the following description, for the purposes of explanation and not limitation, specific details are set forth, such as particular components, elements, techniques, etc. to provide an understanding of the example embodiments. However, the example embodiments may be practiced in other manners that depart from these specific details. In other instances, detailed descriptions of well-known methods and elements are omitted so as not to obscure the description of the example embodiments.

System Overview: Example embodiments are directed to a receive beam formation logic, for use in a receiver, and a transmit beam formation logic, for use in a transmitter, for beam formation matching for communications between the transmitter and the receiver in a multiple beam Multiple Input Multiple Output (MIMO) system.

Communication systems, such as, for example, 4G or 5G systems, can support high data-rate and high fidelity applications, which may be achieved by spatial multiplexing of independent data streams and spatial diversity of the same data stream, respectively. Simultaneous transmission of multiple beamformed signals enables such spatial multiplexing and spatial diversity. Specifically, spatial multiplexing may be achieved with multiple transmit beams where each beam may carry a distinct set of one or more signal layers (or streams), while spatial diversity may be achieved with multiple beams where a plurality of beams may carry the same signal layer. Such MIMO transmission based on multiple beams is known as multiple beam MIMO.

While beamforming itself can be performed in MIMO systems, multiple beam MIMO is a fairly new discipline. Multi-beam transmission introduces a challenge for beamforming-capable receivers. Specifically, a phased antenna array may have to decide which beam pattern to use when multiple beamformed signals arrive at its Field of View (FOV) and not at the FOVs of other arrays of the receiver. A phased antenna array has a limited FOV, defined as the angular span over which the main lobe of the array can be directed. For practical reasons such as cost, size, and power consumption, a receiver may be constrained to employ just enough phased antenna arrays such that a range of Angle of Arrival (AoA) is covered by a limited number of, or even only one, array(s). This constraint is particularly relevant for mobile terminals, otherwise known as User Equipment (UE) in 5G terminology.

A challenge in multi-beam transmission can be illustrated with a simple example. Assume that a receiver employs two antenna arrays, each with a 180° FOV in azimuth and elevation, such that the two FOVs cover the entire sphere of reception angles and do not overlap with each other. A transmitter may use one transmission (Tx) beam, in which case the signal arrives at one of the two receiving (Rx) antenna arrays. Then the array can simply follow the classical beamforming procedure, directing the main lobe (beam) toward an angle according to an optimization criterion, such as, for example, maximization of received signal quality or energy. If a higher data rate is desired and the channel condition is sufficiently favourable, the transmitter may use two spatially decoupled Tx beams to transmit two spatially multiplexed signal streams to the receiver. The channel between the transmitter and the receiver may be such that the two beamformed signals arrive at only one of the two receiver antenna arrays, with a significant AoA separation. The challenge lies in capturing both of the signals at the receiver.

Thus, example embodiments can provide a transmitter and receiver system that enables a beamforming receiver to select an appropriate antenna beam pattern for multi-beam MIMO communications. In such a system, multiple transmit beams may carry multiple layers within one transmission.

Thus, the receiver is to be in position to match the plurality of transmit beams with a corresponding plurality of receive beams. Therefore, the example embodiments are directed towards bilateral beamforming where both a transmitter and a receiver will perform beamforming to enable communications in a multi-beam MIMO system.

Some example embodiments can have the advantage of providing increased communications quality in multiple beam MIMO systems by providing a system that allows for efficient beamforming on both the transmitter and receiver side. Furthermore, a communication system utilizing the example embodiments may support multi-beam transmission and reception to achieve higher data rates and/or higher fidelity than is possible with single-beam transmission and reception.

FIG. 1 illustrates a multi-beam MIMO system 100, according to the example embodiments. The system 100 comprises a transmitter 101 and receiver 201 pair. The transmitter-receiver pair may comprise of a base station-user equipment, user equipment-user equipment, base station-wireless relay, or a macro base station-pico base station pairing.

The transmitter 101 features a plurality of transmitting antennas 103a-103m. The transmitter 101 is configured to transmit multiple signal layers with multiple beams, where each transmit beam may carry a different set of layers. The transmitted signal layers are sent to a receiver 201. The receiver 201 comprises a plurality of receiving antennas 203a-203m to receive the multi-beam MIMO communications provided by the transmitter 101. According to some of the example embodiments, the transmitting and receiving antennas are directional phased array antennas.

A "layer" is a logically distinct subset of a signal set that may be independently transmitted. A "beam" refers to a main-lobe of an antenna radiation pattern. Thus a beam represents a direction that the transmitter/receiver focuses on for transmitting/receiving signals. In general, the relationship between layers and beams can be many-to-many. In the context of multi-beam MIMO, each Tx beam may be used to transmit one (single polarized antennas) or two layers (cross polarized antennas) of signal.

The transmitter 101 further comprises a transmit beamforming logic 105. The transmit beamforming logic 105 determines a beam formation for each transmitting beam. Beam formation refers to the radiation pattern, or the combination thereof, of the transmitting beams. Each beam formation may comprise one or more beams or main-lobes. Similarly, the receiver 201 comprises a receiving beamforming logic 205. The receiving beamforming logic 205 is also configured to determine a beam formation for receiving data from the transmitter 101.

According to some of the example embodiments, the transmitter 101 will transmit a plurality of reference signal configurations to the receiver 201. The plurality of transmitted reference signal configurations are carried by distinct beam formations. A reference signal configuration is a signal pattern occupying a known set of frequency-time resources, carried by a distinct transmit beam.

The receiver 201, via the receiving beamforming logic 205, will determine corresponding receiving beam formations used to receive the transmitted signals. The determination of which receiving beam formations correspond to a particular transmitting beam formation is based on a beam acquisition in which channel conditions for various transmitting and receiving beam formation pairs are measured. The results of such a beam acquisition may be compiled and stored within the receiver. According to some of the example embodiments, the results may be in the form of weightings or rankings of receiving beam formations for each corresponding transmitting beam formation.

The receiver 201, via the receive beam formation logic 205, will thereafter determine channel conditions for each of the different combinations of the transmitting and corresponding receiving beam formations based on the reference signal configurations. Based on the determined channel conditions, the receive beam formation logic 205 will make a recommendation regarding which transmitting beam formation the transmitter should use for communications between the transmitter 101 and the receiver 201.

A reference signal, for example, a Beamforming Reference Signal (BRS) or a Channel State Information—Reference Signal (CSI-RS), is a generic term and is typically used to cover a broad range of meaning. For example, CSI-RS may mean the whole set of CSI-RSs in one subframe, the whole class of CSI-RS in general, one particular CSI-RS configuration, or even a single Resource Element (RE) member of a CSI-RS.

A CSI-RS "configuration" is a group of CSI-RS REs that corresponds to a single transmit beam pattern. Multiple configurations may be assigned in a single CSI-RS symbol. An aspect of some of the example embodiments is to repeat at least some of the CSI-RS configurations (hence beam patterns) over multiple CSI-RS symbols, so that the receiver can try multiple receive beam patterns for a given CSI-RS configuration.

The remainder of the description is presented as follows. First, the beam acquisition stage will be discussed in greater detail under the heading 'Beam Acquisition'. Thereafter, the process of how the receive beam formation logic 205 determines a recommended transmitting beam formation is discussed under the heading 'Beam Matching'. Thereafter, example node configurations of the receiving and transmit beam formation logic is provided under the heading 'Example Configuration'. Example operations of the receiving and transmit beam formation logic is provided under the heading 'Example Operations' and various working examples are provided under the heading 'Working Examples'.

Beam Acquisition: According to some of the example embodiments, as a first stage a beam acquisition process may be utilized to test representative combinations of transmitting and receiving beam formations. According to some of the example embodiments, the beam acquisition process may take place in a periodic and/or aperiodic manner. Periodic beam acquisition may be based on a reference signal configuration, e.g. beamforming reference signal (BRS), with the period configured to match the expected time duration in which the spatial channel structure remains stable. Aperiodic beam acquisition may be triggered during an initial attach and/or after a change in measured channel conditions between the transmitter and receiver has occurred.

Periodic coarse beam matching may be based on BRS with longer periods. This BRS-based search (acquisition) may be "global" searches over candidate pairs of single Tx beam and single Rx beam. Periodic fine beam matching (tracking) and Channel State Information (CSI) reporting may be based on CSI-RS with shorter periods. This CSI-RS-based search would comprise "local" searches over candidate pairs of Tx beam patterns and Rx beam patterns. The Tx beam patterns would be selected from a subset of the transmit beams, based on the receiver feedback from the acquisition, and may comprise different number of beams (different number of layers).

In one example, BRS-based global search may be done with single Tx-beam & single Rx-beam patterns at each antenna array, and received power may be measured. Then CSI-RS-based local search may be done with multiple CSI-RS symbols, where single Tx-beam and dual Tx-beams may be used. Based on the BRS-based beam-pair matching data and CSI-RS beam indicator from the transmitter, the receiver can deduce what beam patterns to try at each CSI-RS symbol. The receiver would estimate channel quality for each CSI-RS and can recommend how many Tx-beams to use, or equivalently how many layers to transmit simultaneously.

The Tx-Rx beam pair acquisition, for determining initial Tx and Rx beams suitable for transmission and reception, may be done based on the Beamforming Reference Signals (BRS), Channel State Information—Reference Signals (CSI-RS) or any other reference signal known in the art. Following a beam pair matching strategy, the transmitter may cycle through different Tx beams over time and/or frequency, and the receiver may cycle through different Rx beams over time and/or frequency. To achieve sufficiently large cell coverage, it may be desirable for both the transmitter and the receiver to adopt single-main-lobe pattern at the antennas during an acquisition process. The receiver may optionally signal to the transmitter an indication of its beamforming capability, i.e. whether or not the receiver supports beamforming or only omnidirectional reception.

According to some of the example embodiments, channel conditions may be measured for each of the possible combinations of the transmitting and receiving beam formations. Examples of channel condition measurements may comprise a Channel Quality Indicator (CQI), Reference Signal Received Power (RSRP), Reference Signal Received Quality (RSRQ), Received Signal Strength Indicator (RSSI), Signal to Noise Ratio (SNR), Signal to Interference plus Noise ratio (SINR), Signal to Noise plus Distortion ratio (SNDR), as well as any other channel or signal metric known in the art.

The measured channel conditions may be stored within the receiver 201 or receive beam formation logic 205. The stored data may be sorted such that for a given transmitting beam formation, corresponding receiving beam formation(s) yielding the most favourable measured channel conditions may be correlated.

Beam Matching: Throughout communications between the transmitter 101 and receiver 201, beam matching is performed to improve the quality of communications between the two. The beam matching may be performed periodically, where the period is typically shorter than the beam acquisition period. According to some of the example embodiments, the beam matching may be performed before every subframe or before a set number of subframes, for example, before every 5 subframes. The frequency of performing beam matching can be decided by the network and may depend on the expected stability of the communication channel.

The Tx-Rx beam matching, for keeping desirable beam pair(s) up-to-date with respect to variation in time, may be done based on the CSI-RS. For tracking purposes, CSI-RS offers an advantage over BRS in the sense that (1) BRS may be reserved for single-main-lobe patterns for coverage reasons, while a set of CSI-RS may be transmitted and received with any single- or multi-main-lobe pattern, and (2) CSI-RS can be compactly configured with a selected number of candidate Tx beams and, hence, is amenable to an efficient beam pair search at the receiver. The beam pair tracking may also be based on BRS.

During the beam matching, the transmitter 101 will send various reference signal configurations to the receiver 201. The reference signal configurations will be transmitted using different transmitting beam formations. As the transmitter and receiver are in a multiple beam MIMO system, at least two distinct transmitting beam formations will be utilized. Specifically, the transmitter will use at least two distinct radiation patterns in a single beam matching instance.

Prior to sending the various reference signal configurations, the transmitter 101 will inform the receiver 201 of which transmitting beam formations will be utilized for the beam matching. The transmitter 101 will inform the receiver of such information by sending beam formation identification information to the receiver. The receiver 201 will thereafter determine the most appropriate corresponding receiving beam formations for each of the transmitting beam formations. The receiver 201 will make this determination based on data obtained during the beam acquisition stage.

The receiver 201 will receive the communications provided by the transmitter 101 with the determined corresponding receiving beam formations. Channel condition measurements will thereafter be performed for each combination of the transmitting and receiving beam formations. The receiver will recommend a transmitting beam formation, or any number of transmitting beam formations, to the transmitter to be used for future communications. The recommended transmitting beam formation(s) is thereafter sent to the transmitter via feedback messaging.

The remainder of the heading 'Beam Matching' is arranged as follows. First, further explanation as to what is provided for identifying transmitted beam formations is provided under the subheading 'Beam Formation Identification'. Thereafter, an explanation of how reference signal configurations are provided is discussed under the subheading 'Reference Signal Configuration Formation'. Finally, a discussion on how a recommended beam formation is determined and communicated is provided under the subheading 'Recommended Beam Formation and Feedback Messaging'.

Beam Formation Identification: It should be appreciated that prior to the receiver 201 receiving the reference signal configurations, the transmitter will provide the receiver with beam formation identification information. The receiver may use the beam formation identification information to determine the appropriate receiving beam formations to apply for each respective transmitting beam formation the receiver receives.

According to some of the example embodiments, the beam formation identification information may comprise any one or more of (1) a number of distinct transmitting beam formations, (2) a number of beams at each of the transmitting beam formations, (3) one or more beam identifiers for each of the transmitting beam formations which identifies the actual formation, (4) frequency-time structure of reference signal configurations, and (5) an indication of a mapping of each transmitting beam formation to a frequency-time block of a reference signal configuration.

According to some of the example embodiments, the beam formation identification information may be provided in a dynamic control message that may be transmitted on a per-subframe, or Transmission Time Interval (TTI), basis. An example of such a dynamic control message is a Downlink Control Information (DCI) message or an Uplink Control Information (UCI) message. According to some of the example embodiments, the beam formation identification information may be provided via semi-static control signalling that may be sent upon the communication link establishment, handover, or any other long-term communications event. An example of such semi-static control signalling is Radio Resource Control (RRC) signalling, which may also be referred to as higher-layer signalling.

Upon receiving the beam formation identification information, the receiver, via the receive beam formation logic, may determine a corresponding receiving beam formation to receive transmitted signals. This determination may be performed using the beam database discussed under the heading 'Beam Acquisition'.

Reference Signal Configuration Formation: A reference signal configuration is a signal pattern occupying a known set of frequency-time resources, carried by a distinct transmit beam. The signal being transmitted by the reference signal configuration is a reference signal.

The reference signal configurations transmitted by the transmitter 101 during the beam matching can comprise a repetition structure to enable the receiver 201 to perform receiving beam adaptation for different transmission ranks, for example, between single-main-lobe beam patterns and multiple-main-lobe beam patterns. According to some of the example embodiments, the reference signal configurations may be repeated in time and/or frequency. Alternatively, multiple transmissions may be provided by the transmitter for a single CSI-RS symbol.

Figure 2:
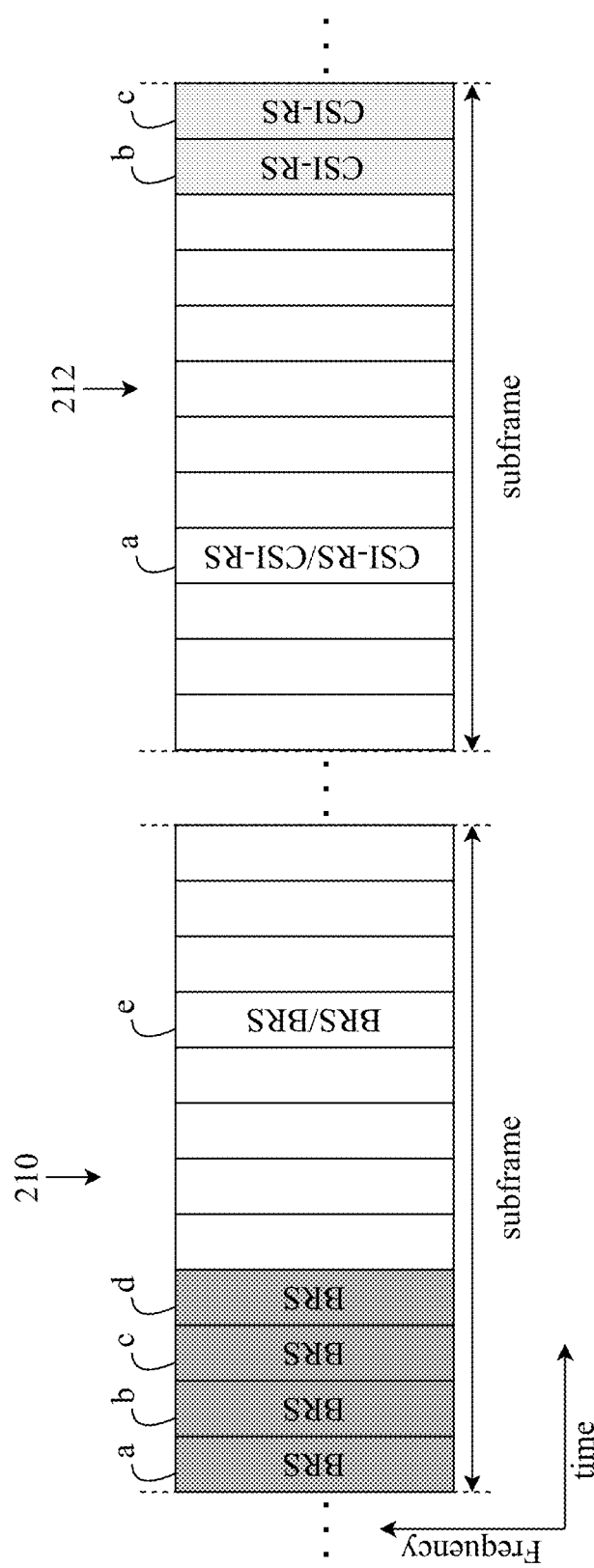
FIGS. 2-5 are examples of subframes carrying reference signal configurations that may be repeated in time or frequency, according to some of the example embodiments.

FIG. 2 illustrates an example frame structure with reference signal configurations repeated in time. A Transmission Time Interval (TTI), or a subframe, comprises one or more symbols in time, and a transmission bandwidth comprises one or more subcarriers in frequency. The basic resource unit that can hold a basic unit of modulated signal is a Resource Element (RE), which occupies one symbol in time and one subcarrier in frequency. This framework may be used to illustrate any waveform whose modulated signal units can logically be represented by distinct time-frequency positions, including orthogonal frequency division multiplexing (OFDM) and its variants.

The REs may carry control signals, reference signal configurations, or data. There may be multiple types of distinct reference signal configurations. According to some of the example embodiments, one type may be designed for beamforming such as Beamforming Reference Signals (BRS). According to some of the example embodiments, another type may be designed for channel state information (CSI) measurements such as Channel State Information Reference Signals (CSI-RS). These RSs may occupy part or all of transmission bandwidth and one or more symbols in a subframe, and they may be allocated in a periodic or aperiodic manner. A symbol containing BRS or CSI-RS is called BRS symbol or CSI-RS symbol, respectively.

FIG. 2 illustrates two subframes 210 and 212. Subframe 210 comprises symbols with BRS. In subframe 210 the symbols labelled 'a'-'d' comprise BRS symbols which are repeated in time, while the symbol labelled 'e' comprises a BRS symbol repeated in frequency. Subframe 212 comprises symbols with CSI-RS. In subframe 212 the symbol labelled 'a' comprises a CSI-RS symbol repeated in frequency, while the symbols labelled 'b' and 'c' comprise CSI-RS repeated in time.

Figure 3:
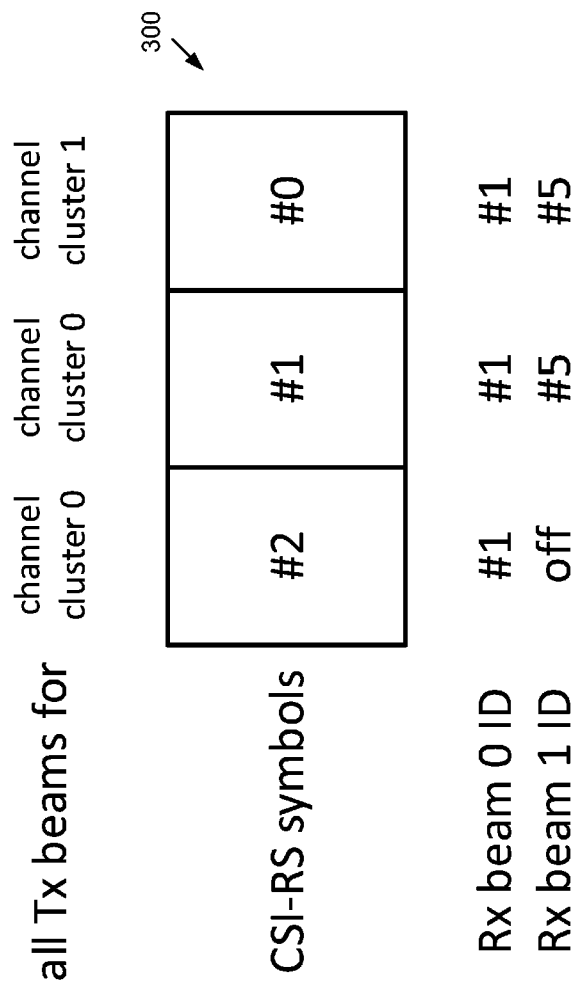

FIG. 3 illustrates an example of a transmission of reference signal configurations that may be received by the receiver 201. In the example provided by FIG. 3, the transmitter 201 uses two beams, one beam associated with channel cluster 0 and a second beam associated with channel cluster 1. Reference signal configurations, CSI-RS symbols, are provided in subframe 300. The subframe 300 comprises three symbols labelled '#0'-'#2'. In symbols #1 and #2, the transmitter 101 sends two CSI-RS signals for the transmission over channel cluster 0 that are repeated in time. Specifically, the same CSI-RS, associated with the transmission of channel cluster 0, is provided in symbol #2 and symbol #1. A second CS-RS symbol is provided in the symbol labelled '#0' for the transmission over channel cluster 1.

Channel cluster herein refers to a group of spatially adjacent propagation paths that exhibit similar characteristics for the purpose of communication. Based on a beam acquisition, the transmitter would typically try to identify and use transmit beams, each of which is associated with a group of propagation paths that match with one of the channel clusters. Thus, the goal of transmit beams selection is to have distinct (largely uncorrelated) propagation condition for each transmit beam.

The repetition of the CSI-RS in symbols '#2' and '#1' allows the receiver to determine channel conditions for receiving channel cluster 0 using different receiving beam formations. For example, for the CSI-RS provided in symbol '#2', the receiver may use a single-main-lobe beam to receive the CSI-RS to test the data rate at a lower rank. For the CSI-RS in symbol '#1' and symbol '#0', the receiver may use omnidirectional or multi-main-lobe beam pattern, which captures the strongest and second strongest channel clusters, respectively. Based on the Channel State Information (CSI) measured from all three of the symbols, the receiver recommend a number of transmit beams or, equivalently, a transmission rank, making a preference choice among the tested beam patterns.

Thus, as shown in FIG. 3, the transmitter 101 may transmit three CSI-RS symbols to one receiver 201 in one subframe. The Tx beams of two CSI-RS symbols may be the same to capture the strongest channel cluster. The Tx beams of the third CSI-RS symbol is used to capture the second strongest channel cluster. The receiver may receive one CSI-RS symbol with the strongest channel cluster with one Rx beam that is utilized for the strongest channel cluster to test the spectrum efficiency of a single beam rank ½ transmission. The receiver may receive the other two CSI-RS symbols with either omnidirectional or dual-lobe Rx beams that are used for both channel clusters to test the spectrum efficiency of dual beam transmission.

According to some of the example embodiments, two CSI processes may be used for the receiver to measure the CSI, and each subframe may comprise 2 CSI-RS symbols for one CSI process. The process may use the same Tx beam pattern as symbol '#1' and '#2' in FIG. 3, or the process may use the same Tx beam pattern as symbol '#0' and '#1' in FIG. 3. When indicating the Physical Downlink Shared Channel (PDSCH) transmission, the transmitter 101 (e.g., a base station) may indicate the index of the CSI process and then the receiver 201 may have the information of the Rx beams for this PDSCH transmission. Alternatively, the transmitter and the receiver may select the CSI processes with the highest spectrum efficiency and the one Rx beam case may have higher priority than the dual-peak Rx beams case if the same spectrum efficiency for the two processes are reported.

According to some of the example embodiments, the transmitter, or the transmit beam formation logic, may use information bits in a DCI message to help the receiver decide which receive beams to use at each CSI-RS symbol. The indication for CSI-RS symbol #2 may be a single Tx beam index or BRS port index, and the indication for CSI-RS symbols #1 and #0 may be two Tx beam indexes or two BRS port indexes. The receiver can map such information to appropriate receive beams based on the stored Tx/Rx beam matching database and create a single-lobe Rx beam pattern at CSI-RS symbol #2 and a dual-lobe Rx at CSI-RS symbols #1 and #0.

While the transmitter may not provide a direct identification of the reception beams, or their indexes, such information may be implied. The indication of the transmit beam index(es) or BRS port index(es) as well as indication or pre-agreement on the number of receive beams at each CSI-RS symbols do provide an indirect indication or a recommendation on which receive beams to use.

According to some of the example embodiments, the transmitter may indicate the Tx beam for the receiver to look up Rx beam for each CSI-RS symbol from the beam database maintained by the receiver. The Tx beam may be indicated explicitly using an index or implicitly using a BRS port number. The transmitter may indicate a single Tx beam for one CSI-RS symbol in order for the receiver to create a narrow Rx beam to receive that symbol. The transmitter may also indicate two Tx beams for one CSI-RS symbol in order for the receiver to create dual-peak Rx narrow beams to receive that symbol. The transmitter may indicate the same Tx beam(s) for more than one CSI-RS symbols.

Figure 4:
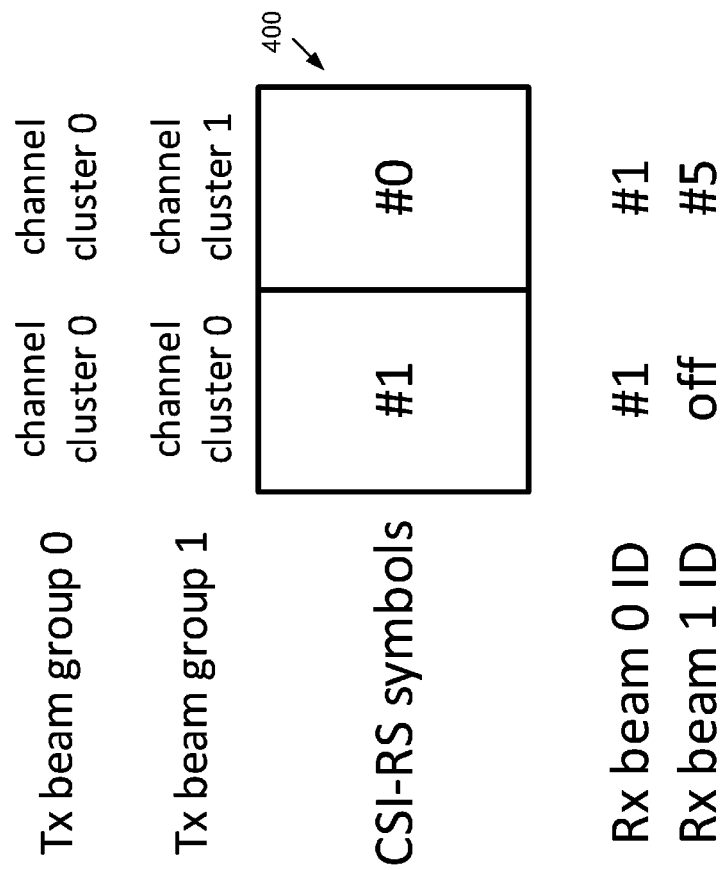

FIG. 4 provides another example of a transmission of reference signal configurations that may be received by the receiver 201. In the example provided in FIG. 4, the reference signal configurations are partially repeated in time. In this example, the transmit beams are formed in to two groups labelled 'group 0' and 'group 1'. Transmit beam 'group 0' comprises a set of beams corresponding to a channel cluster 0 and is repeated in time. Transmit beam 'group 1' comprises another set of beams and corresponds to the channel cluster 0 and 1 in the first and the second CSI-RS symbols, respectively.

In the example provided in FIG. 4, the receiver 201, via the receive beam formation logic 205, may use a single main-lobe receive beam pattern at the CSI-RS symbol #1 matched to the channel cluster 0, and it may use a dual main-lobe receive beam pattern at the CSI-RS symbol #0. The channel conditions measured at the CSI-RS symbol #1 represents a single-beam communication and the channel conditions measured at the CSI-RS symbol #0 represents a dual-beam MIMO communication. An example advantage of the reference signal configurations formation provided in FIG. 4 is that less signalling is required between the transmitter and the receiver as only two CSI-RS are provided within the subframe 400. An example advantage of the reference signal configurations formation provided in FIG. 3 is that a larger number of distinct CSI-RS configurations and, hence, individual transmit beams, can be tested for the dual-beam reception case.

Figure 5:
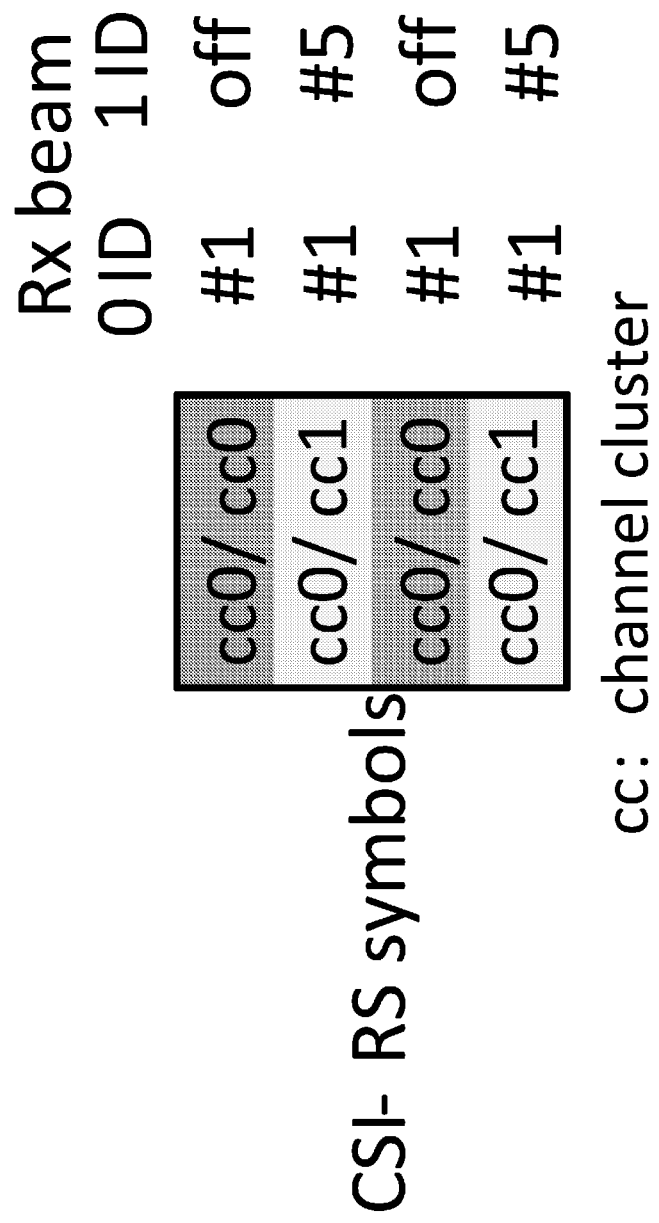

FIG. 5 provides yet another example of a transmission of reference signal configurations that may be received by the receiver 201. In the example provided in FIG. 5, the reference signal configurations are repeated with respect to frequency. All transmission beams at a certain frequency sub-band, or frequency block, correspond to a first channel cluster 'cc 0'. All transmission beams at another frequency sub-band, or frequency block, correspond to a second channel cluster 'cc 1'.

Thus, in the example provided by FIG. 5, the receive beam formation logic 205 is to determine channel conditions using the sub-bands of the CSI-RS symbol corresponding to channel cluster 0 with a single-main-lobe beam formation. The receive beam formation logic 205 is further to determine channel conditions using the sub-bands of the CSI-RS symbol corresponding to channel clusters 0 and 1 with an omnidirectional or multi-main-lobe beam formation. This type of beam pattern matching is only feasible with receivers that can simultaneously form different receive beam patterns in an FOV, where the beam patterns may change over frequency. An example advantage of the embodiment illustrated in FIG. 5 is that this will require the minimum number of CSI-RS symbols to achieve multi-beam MIMO.

Recommended Beam Formation and Feedback Messaging: Upon receiving the reference signal configurations using the different combinations of the transmitting beam formations and corresponding receiving beam formations, the receive beam formation logic 205 may determine a recommended transmitting beam formation for the transmitter 101 to use for future communications between the transmitter and receiver. This recommendation may be made by determining channel conditions for each, or at least a subset, of the different combinations of the transmitting and receiving beam formations. It should be appreciated that the determination of the channel conditions may be similar to that described under the heading 'Beam Acquisition'. Specifically, the determination may be based on appropriate channel or signal metric or measurement known in the art.

According to some of the example embodiments, the recommendation may be based on the combination of the receiving and transmitting beam formation corresponding to a most desirable determined channel condition. For example, the combination yielding channel conditions of a highest determined received signal strength. It should be appreciated that any other signal or channel metric may be utilized for determining a recommended combination of the receiving and transmitting beam formation.

According to some of the example embodiments, instead of a highest signal metric or a most desirable determined channel condition, the recommended beam formation combination may be determined based on the any number of thresholds. For example, a threshold may be established for a specific, or a group, of channel or signal metrics. Thus, once a determined channel condition for a specific combination reaches such a threshold, this combination may be deemed the recommended receiving and transmitting beam formation for future communications.

It should be appreciated that during the beam matching phase, the receive beam formation logic 205 may be configured to update the database of corresponding receiving beam formations provided during the beam acquisition phase, as discussed under the heading 'Beam Acquisition'. Specifically, the receive beam formation logic measures beam reference signal configurations and keeps track of each Tx beam with the corresponding Rx beam for at least the best candidate Tx beam. By doing so the receive beam formation logic maintains the database of Tx/Rx beam pairs from which the receive beam formation logic may get the best Rx beam for a corresponding Tx beam.

Once the receiver 201, via the receive beam formation logic 205, has determined the channel conditions for the different combinations of the transmitting and receiving beam formations, and a recommendation as to which transmitting and receiving beam formation should be used is made, the recommendation may be transmitted to the transmitter 101 or the transmit beam formation logic 105. This recommendation may be provided in a feedback message.

According to some of the example embodiments, the feedback message may also comprise a beam selector, rank indicator, a Channel Quality Indicator (CQI), and/or a Precoding Matrix Indicator (PMI), for the recommended transmitting beam formation or each recommended transmitting beam formation.

Returning to the example provided in FIG. 3, if the receiver recommends a single beam transmission, it shall report a single beam selector that selects the best beam from CSI-RS symbol '#2'. If the receiver recommends dual beam transmission, it shall report two beam selectors. The first beam selector selects a beam from CSI-RS symbol '#1' and the second beam selector selects a beam from CSI-RS symbol '#0'.

Figure 6:
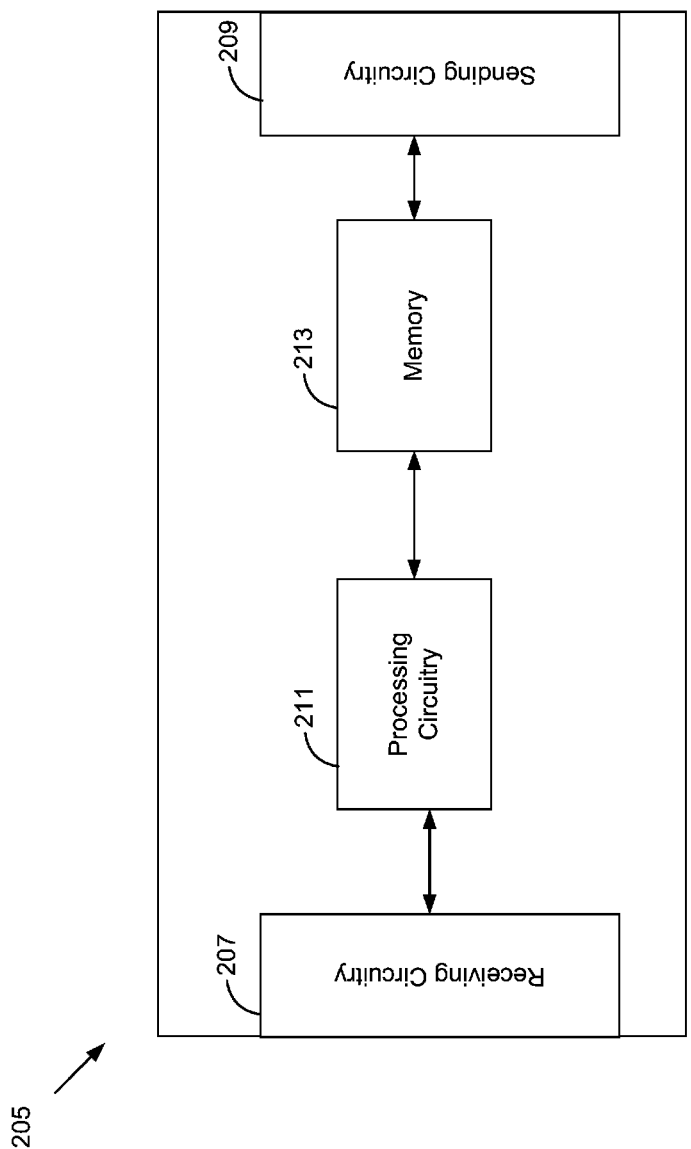
FIG. 6 is an example configuration of a receiver, according to some of the example embodiments.

Example Configuration: FIG. 6 illustrates an example configuration of the receive beam formation logic 205 for use in a receiver 201. According to some of the example embodiments, the receiver, from which the receive beam formation logic may form part of, may be or form a part of a user equipment, a wireless relay node or a pico base station. The receive beam formation logic 205 may comprise receiving circuitry 207 and sending circuitry 209 that may receive and transmit any form of communications or control signals within a network. The receive beam formation logic 205 may alternatively comprise a single transceiving component or any number of receiving and/or transmitting components.

The receive beam formation logic 205 may further comprise at least one memory 213 that may be in communication with the receiving circuitry 207 and the sending circuitry 209. The memory 213 may store received or transmitted data and/or executable program instructions. The memory may also store information relating to measured reference signal configurations or preferred transmitting and receiving beam formation pairings. The memory 213 may be any suitable type of machine readable medium and may be of a volatile and/or non-volatile type.

The receive beam formation logic 205 may also comprise processing circuitry 211 that may be configured to process received reference signal configurations and measure corresponding channel conditions. The processing circuitry 211 may be any suitable computation logic, for example, a microprocessor, digital signal processor (DSP), field programmable gate array (FPGA), or application specific integrated circuitry (ASIC) or any other form of circuitry.

Figure 7:
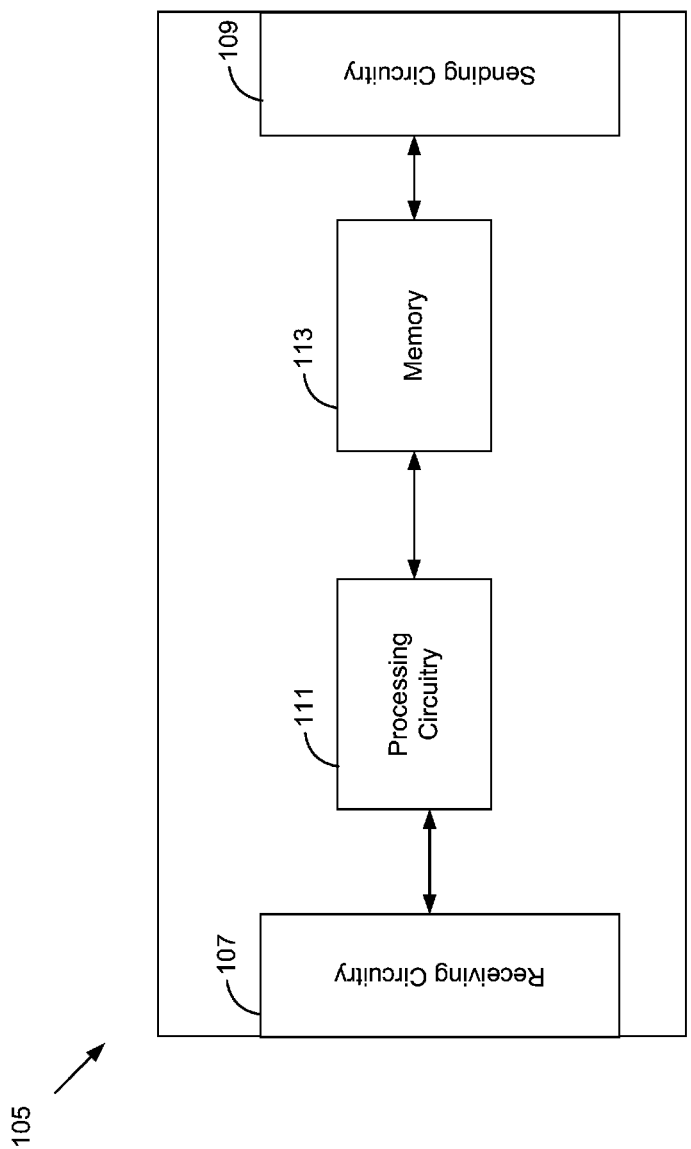
FIG. 7 is an example configuration of a transmitter, according to some of the example embodiments.

FIG. 7 illustrates an example node configuration of a transmit beam formation logic 105 for use in a transmitter 101. According to some of the example embodiments, the transmitter, from which the transmit beam formation logic forms a part of, may be or form a part of a base station, a user equipment, or a macro base station. The transmit beam formation logic 105 may comprise receiving circuitry 107 and sending circuitry 109 which may receive and transmit any form of communications or control signals within a network. The transmit beam formation logic 105 may alternatively comprise a single transceiving component or any number of receiving and/or transmitting components.

The transmit beam formation logic 105 may further comprise at least one memory 113 that may be in communication with the receiving circuitry 107 and the sending circuitry 109. The memory 113 may store received or transmitted data and/or executable program instructions. The memory may also store information relating to measured reference signal configurations or preferred transmitting and receiving beam formation pairings. The memory 113 may be any suitable type of machine readable medium and may be of a volatile and/or non-volatile type.

The transmit beam formation logic 105 may also comprise processing circuitry 111 which may be configured to process received information related to recommend beam formations and reference signal measurement instructions. The processing circuitry 111 may be any suitable computation logic, for example, a microprocessor, digital signal processor (DSP), field programmable gate array (FPGA), or application specific integrated circuitry (ASIC) or any other form of circuitry.

Figure 8:
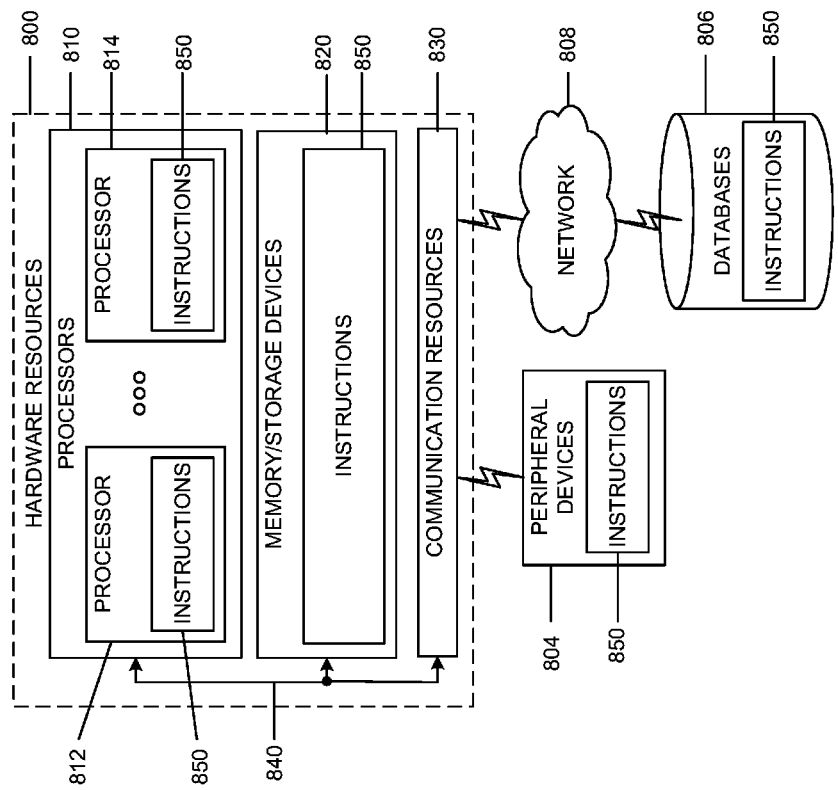
FIG. 8 is an example configuration of hardware resources which may be provided in any nodes or logic, according to some of the example embodiments.

FIG. 8 is a block diagram illustrating components, according to some example embodiments, able to read instructions from a machine-readable or computer-readable medium (e.g., a machine-readable storage) and perform any one or more of the methodologies discussed herein. Storage herein may refer to at least one or more of a chip, stick, circuitry, optical storage, medium, device, etc. It should be appreciated that the components of FIG. 8 may be featured in the receiver 201, receive beam formation logic 205, transmitter 101 and/or the transmit beam formation logic 105.

FIG. 8 shows a diagrammatic representation of hardware resources 800 including one or more processors (or processor cores) 810, one or more memory/storage devices 820, and one or more communication resources 830, each of which are communicatively coupled via a bus 840.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814. The memory/storage devices 820 may include main memory, disk storage, or any suitable combination thereof.

The communication resources 830 may include interconnection and/or network interface components or other suitable devices to communicate with one or more peripheral devices 804 and/or one or more databases 806 via a network 808. For example, the communication resources 830 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 and/or the databases 806. Accordingly, the memory of processors 810, the memory/storage devices 820, the peripheral devices 804, and the databases 806 are examples of computer-readable and machine-readable media.

Figure 8A:
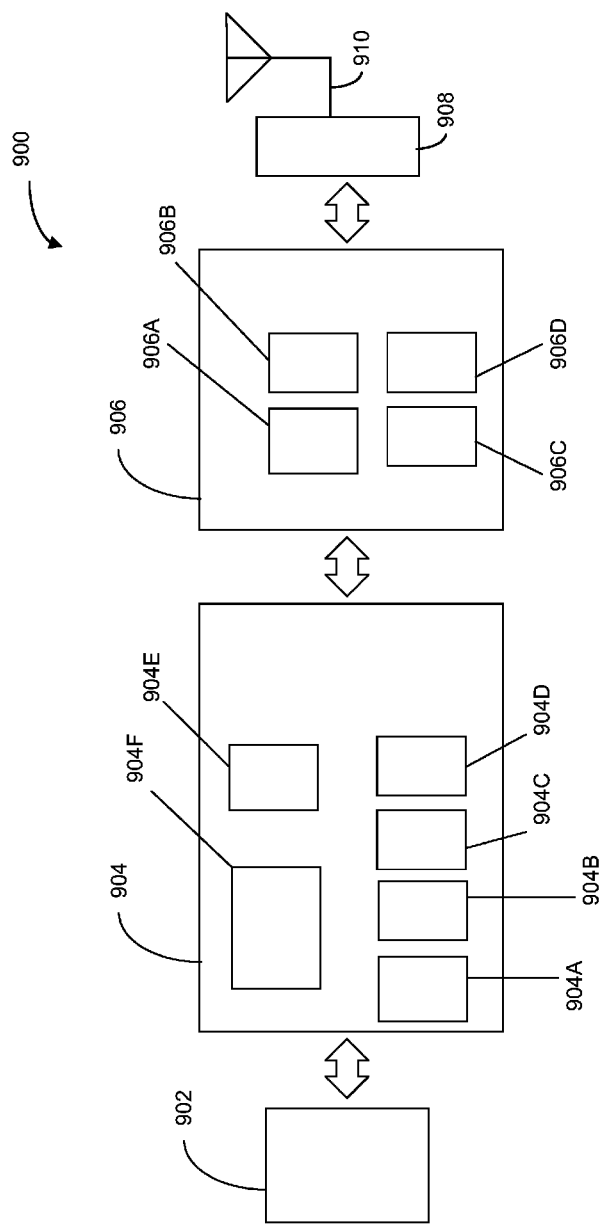
FIG. 8A is an example configuration of a user equipment, according to some of the example embodiments.

FIG. 8A illustrates, for one embodiment, example components of a UE device 900 in accordance with some embodiments. The UE device 900 may comprise the transmit beam formation logic 105, where in such cases the UE device 900 functions as a transmitter 101. The UE device 900 may comprise the receive formation logic 205, where in such cases the UE device 900 functions as a receiver 201.

In some embodiments, the UE device 900 may include application circuitry 902, baseband circuitry 904, Radio Frequency (RF) circuitry 906, front-end module (FEM) circuitry 908, and one or more antennas 910, coupled together at least as shown. In some embodiments, the UE device 900 may include additional elements such as, for example, memory/storage, display, camera, sensor, and/or input/output (I/O) interface.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 904e of the baseband circuitry 904 may be configured to run elements of the protocol stack for signalling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc., to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE 900 comprises a plurality of power saving mechanisms. If the UE 900 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 900 may transition off to an RRC_Idle state, where it disconnects from the network and does not perform operations such as channel quality feedback, handover, etc. The UE 900 goes into a very low power state and it performs paging where again it periodically wakes up to listen to the network and then powers down again. The device cannot receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Figure 9:
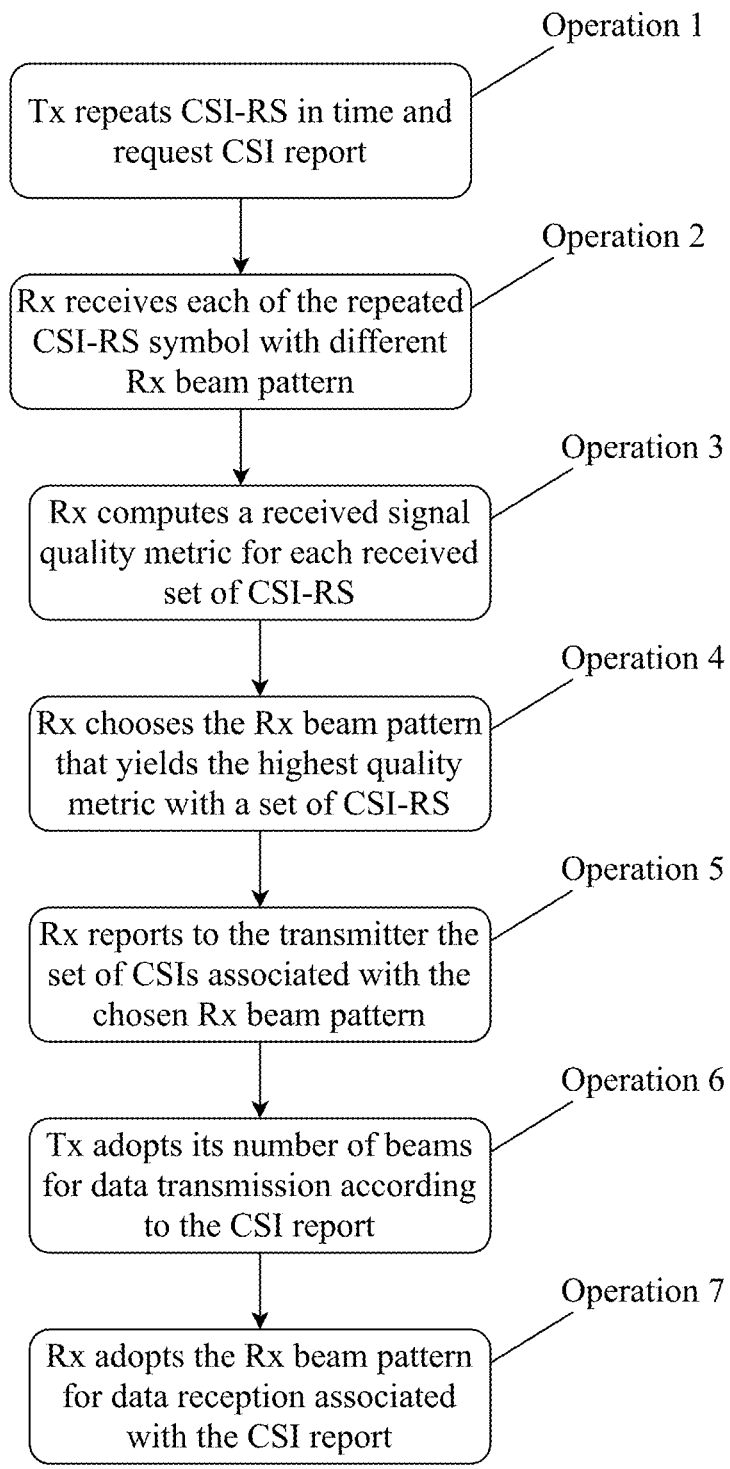
FIG. 9 is a flow diagram depicting example operations that can be performed by the system of FIG. 1, according to some of the example embodiments.

Example Operations: FIG. 9 is a flow diagram depicting example operations which may be taken by the transmitter 101, transmit beam formation logic 105, receiver 201 and receive beam formation logic 205 of FIGS. 1 and 6-8. FIG. 9 provides an overview of the beam matching or beam tracking procedure between the receiver and transmitter.

Operation 1: The transmitter repeats a set of CSI-RS in time, within a time window. The time window can be shorter than an expected coherence time of the channel spatial structure Such repetition may be achieved by configuring identical sets of CSI-RS with identical Tx beams in each of the repeated CSI-RS symbols. The number of repetitions may depend on the receiver beamforming capability, which may be optionally indicated by the receiver. In addition, the transmitter 101 requests one or more than one CSI report associated with the repeated set of CSI-RS. The report may comprise one or more CSIs, each of which is associated with one or more CSI-RS within the set. The transmitter may also indicate the location and configuration of the CSI-RS to the receiver via control signals.

Operation 2: The receiver 201 receives each of the repeated CSI-RS symbols with a different Rx beam pattern or beam formation. As an example, if two repeated symbols are available, the receiver may choose a single-main-lobe pattern for one symbol and a dual-main-lobe pattern for the other symbol. If the receiver supports omnidirectional beam pattern, the candidate Rx beam patterns may comprise the omnidirectional pattern. The receiver may utilize the relationship between BRS and the CSI-RS, if available, to deduce the Rx beam(s) for each CSI-RS symbol.

Operation 3: The receiver 201 computes a received signal quality metric for each received CSI-RS or a combination thereof, according to the CSI report format associated with the report request. Thus, if a CSI-RS is repeated twice, then two metrics are computed, each associated with a distinct Rx beam pattern as per Operation 2. The received signal quality metric may represent the expected spectral efficiency with respect to the candidate Tx beam(s) adopted for the CSI-RS(s) and the Rx beam(s) adopted for the CSI-RS symbol. One such practical metric is the mutual information between transmitted and received versions of the reference signal configurations.

Operation 4: The receiver 201 chooses the Rx beam pattern that meets a predetermined metric, for example, a predetermined quality metric. An example of such a quality metric may be a RX beam pattern that yields the highest (best) quality metric among all metrics computed for the requested CSI report. If two beam patterns yield the same highest metric, then a preference may be given to the pattern with a smaller number of main lobes.

Operation 5: The receiver 201 reports the CSIs associated with the chosen Rx beam pattern. This means that, while the best CSI with the chosen pattern is better than or equal to the best CSI with other patterns, this is not necessarily true for the other CSIs in the same report.

Operation 6: The transmitter, after an agreed number of subframes, configures its Tx beams and, hence, the number of beams for data transmission to the receiver according to the CSI report.

Operation 7: The receiver, at the subframe of the Operation 6, configures its Rx beam pattern and the beam for data reception according to the CSI report.

Figure 10:
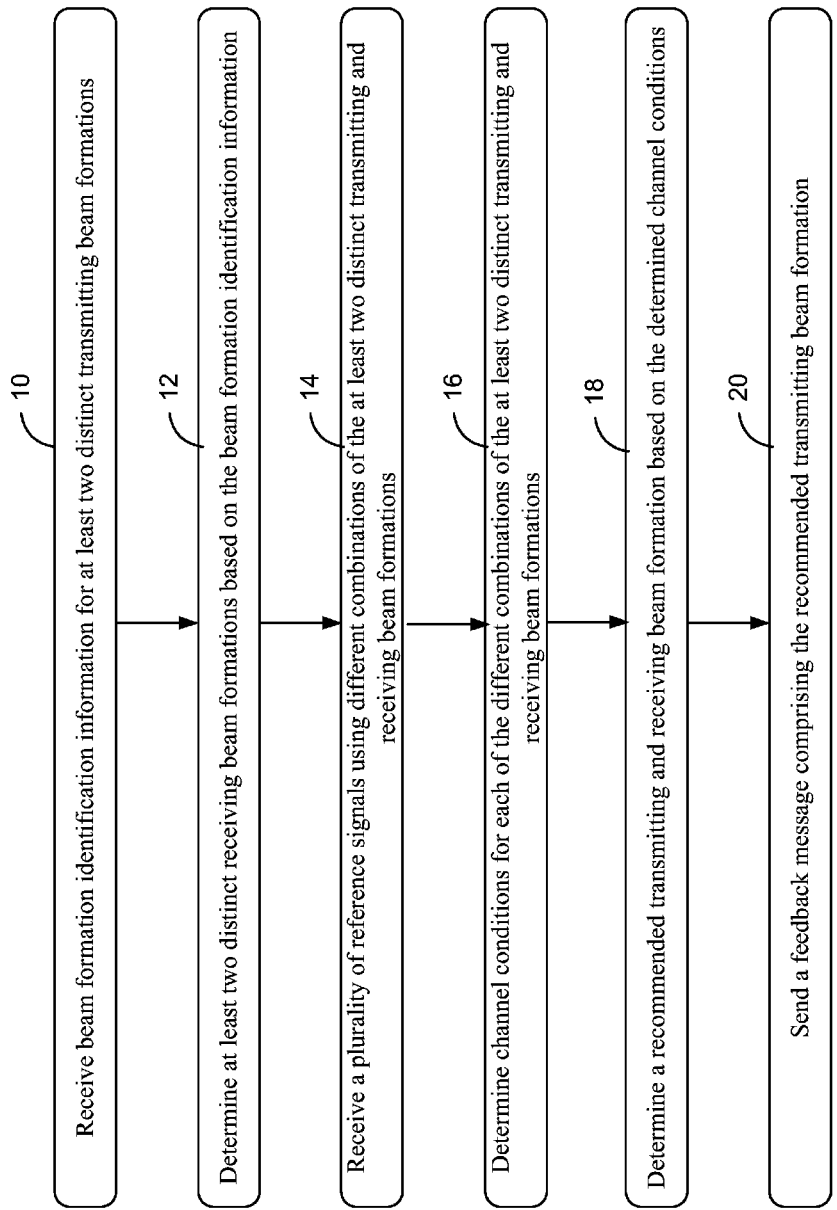
FIG. 10 is a flow diagram depicting example operations that can be performed by the receiver of FIG. 6, according to some of the example embodiments.

FIG. 10 is a flow diagram depicting example operations which may be taken by the receive beam formation logic 205, for use in a receiver 201 of FIGS. 1 and 6, in providing beam formation matching for communications between the receiver and the transmitter 101 in a multiple beam MIMO system. According to some of the example embodiments the transmitter-receiver pair may comprise a base station-user equipment, a first user equipment-a second user equipment, a base station-wireless relay node, or a macro base station-pico base station.

It should be appreciated that the operations of FIG. 10 need not be performed in order. Furthermore, it should be appreciated that not all of the operations need to be performed. The example operations may be performed in any order and in any combination.

Operation 10

The receive beam formation logic 205 receives 10, from a transmit beam formation logic 105 for use in the transmitter 201, beam formation identification information for at least two distinct transmitting beam formations. The receiving circuitry 207 or processing circuitry 211 of the beam formation logic 205 may be configured to receive, from a transmit beam formation logic 105 for use in the transmitter 201, beam formation identification information for at least two distinct transmitting beam formations. Operation 10 is further described under at least the subheading 'Beam Formation Identification'.

According to some of the example embodiments, the receive beam formation logic 205 may use the beam formation identification information to determine appropriate corresponding receiving beam formations for receiving reference signal configurations transmitted by the transmitter using the identified at least two distinct transmitting beam formations.

According to some of the example embodiments, the beam formation identification information may comprise any one or more of (1) a number of distinct transmitting beam formations, (2) a number of beams at each of the transmitting beam formations, (3) one or more beam identifiers for each of the transmitting beam formations, (4) frequency-time structure of reference signal configurations, and (5) an indication of a mapping of each transmitting beam formation to a frequency-time block of a reference signal configurations, taken jointly and severally in any and all permutations.

According to some of the example embodiments, at least a subset of the beam formation identification information is provided in a DCI message, a UCI message or via RRC signalling.

Operation 12

The receive beam formation logic also determines 12 at least two distinct receiving beam formations based on the beam formation identification information. The processing circuitry 211 determines the at least two distinct receiving beam formations based on the beam formation identification information. Operation 12 is further described under at least the subheadings 'Beam Acquisition' and 'Beam Formation Identification'.

According to some of the example embodiments, the processing circuitry is configured to determine the at least two distinct receiving beam formations via a data retrieval from a receiver maintained beam database. The beam database comprises a receiving beam formation for a given transmitting beam formation. The database may be compiled via the receive beam formation logic during a beam acquisition stage.

Operation 14

The receive beam formation logic further receives 14, from the transmit beam formation logic, a plurality of reference signal configurations using different combinations of the at least two distinct transmitting and receiving beam formations. The receiving circuitry 207 or processing circuitry 211 is configured to receive the plurality of reference signal configurations using different combinations of the at least two distinct transmitting and receiving beam formations. Operation 14 is further described under at least the subheading 'Beam Matching'.

According to some of the example embodiments, at least one reference signal configurations is repeated in time and/or frequency. An example of reference signal configurations repeated in time is provided in at least FIGS. 2 and 3. An example of reference signal configurations repeated in frequency is provided in at least FIGS. 2 and 5. According to some of the example embodiments, the plurality of reference signal configurations comprise CSI-RS and/or BRS.

Operation 16

The receive beam formation logic further determines 16 channel conditions for each of the different combinations of the at least two distinct transmitting and receiving beam formations. The processing circuitry 211 determines the channel conditions for each of the different combinations of the at least two distinct transmitting and receiving beam formations. Operation 16 is further described under at least the subheadings 'Beam Acquisition' and 'Recommended Beam Formation and Feedback Messaging'.

According to some of the example embodiments, channel conditions may be measured for each of the possible combinations of the transmitting and receiving beam formations. Examples of channel condition measurements may comprise a Channel Quality Indicator (CQI), Reference Signal Received Power (RSRP), Reference Signal Received Quality (RSRQ), Received Signal Strength Indicator (RSSI), Signal to Noise Ratio (SNR), Signal to Interference plus Noise ratio (SINR), Signal to Noise plus Distortion ratio (SNDR), taken jointly and severally in any and all permutations, as well as any other channel or signal metric known in the art.

Operation 18

The receive beam formation logic further determines 18 a recommended transmitting and receiving beam formation, of the at least two distinct transmitting and receiving beam formations, respectively, based on the determined channel conditions. The processing circuitry 211 determines the recommended transmitting and receiving beam formation, of the at least two distinct transmitting and receiving beam formations, respectively, based on the determined channel conditions. Operation 18 is further discussed under at least the subheading 'Recommended Beam Formation and Feedback Messaging'.

According to some of the example embodiments, at least one of the determined channel conditions is received signal strength. In such embodiments, the processing circuitry may further determine the recommended transmitting and receiving beam formation as the combination of the receive and transmitting beam formation corresponding to a highest determined received signal strength or a determined received signal strength above a signal threshold. It should be appreciated that any other signal or channel metric, apart from received signal strength, may be evaluated with respect to a threshold.

According to some of the example embodiments, not all of the combinations need to be measured. For example, once a combination of a transmitting and receiving beam formation is determined to comprise a signal or channel metric meeting the threshold, such a combination may be deemed to be the recommended combination and all other measurements may be halted.

Operation 20

The receive beam formation logic sends 20, to the transmit beam formation logic, a feedback message comprising the recommended transmitting beam formation. The recommended transmitting and receiving beam formations are matched for communications between the transmitter and the receiver. The sending circuitry 209 or processing circuitry 211 sends, to the transmit beam formation logic, the feedback message comprising the recommended transmitting beam formation. Operation 20 is further described under at least the subheading 'Recommended Beam Formation and Feedback Messaging'.

According to some of the example embodiments, the feedback message comprises a rank indicator, CQI, and/or PMI for the recommended transmitting beam formation.

According to some of the example embodiments, the feedback message may comprise a prescribed number of recommended transmitting beam formations for communications between the transmitter and the receiver. For example, the receiver or receive beam formation logic may further recommend how many transmission beams should be used simultaneously for communications between the transmitter and receiver.

Figure 11:
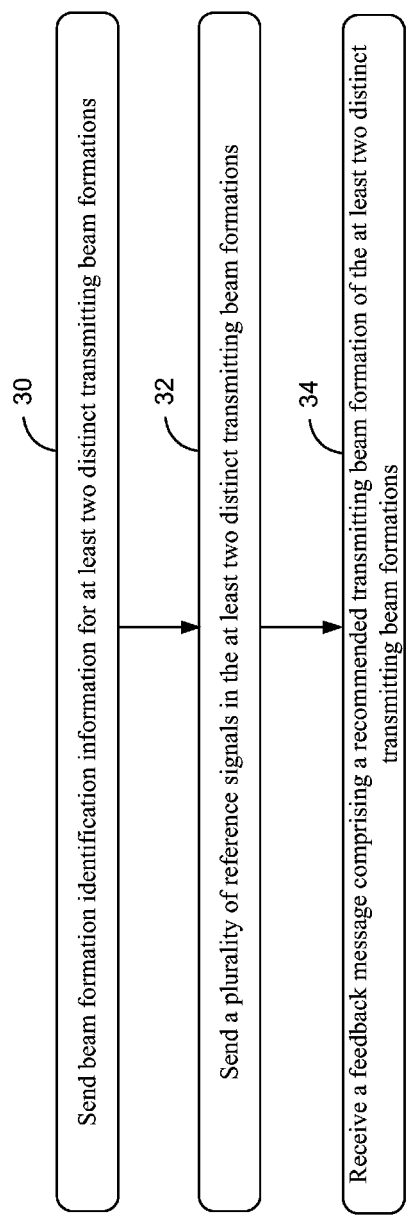
FIG. 11 is a flow diagram depicting example operations that can be performed by the transmitter of FIG. 7, according to some of the example operations.

FIG. 11 is a flow diagram depicting example operations that may be taken by the transmit beam formation logic 105, for use in a transmitter 101 of FIGS. 1 and 7, in providing beam formation matching for communications between the receiver and the transmitter 101 in a multiple beam MIMO system. According to some of the example embodiments the transmitter-receiver pair may comprise a base station-user equipment, a first user equipment-a second user equipment, a base station-wireless relay node, or a macro base station-pico base station.

It should be appreciated that the operations of FIG. 11 need not be performed in order. Furthermore, it should be appreciated that not all of the operations need to be performed. The example operations may be performed in any order and in any combination.

Operation 30

The transmit beam formation logic 105 sends 30, to a receive beam formation logic 205, beam formation identification information for at least two distinct transmitting beam formations. The sending circuitry 109 or processing circuitry 111 sends, to the receive beam formation logic 205, beam formation identification information for at least two distinct transmitting beam formations. Operation 30 is further described under at least subheading 'Beam Formation Identification'.

According to some of the example embodiments, the beam formation identification information may comprise any one or more of (1) a number of distinct transmitting beam formations, (2) a number of beams at each of the transmitting beam formations, (3) one or more beam identifiers for each of the transmitting beam formations, (4) frequency-time structure of reference signal configurations, and (5) an indication of a mapping of each transmitting beam formation to a frequency-time block of a reference signal configurations taken jointly and severally in any and all permutations.

According to some of the example embodiments, at least a subset of the beam formation identification information is provided in a DCI message, a UCI message or via RRC signalling.

Operation 32

The transmit beam formation logic 105 sends 32, to the receive beam formation logic 205, a plurality of reference signal configurations in the at least two distinct transmitting beam formations for testing channel conditions for the at least two distinct transmitting beam formations. The sending circuitry 109 or processing circuitry 111 sends, to the receive beam formation logic 205, the plurality of reference signal configurations in the at least two distinct transmitting beam formations for testing channel conditions for the at least two distinct transmitting beam formations. Operation 32 is described further under at least the subheading 'Beam Matching'.

According to some of the example embodiments, at least two of the plurality of reference signal configurations are repeated in time and/or frequency. An example of reference signal configurations repeated in time is provided in at least FIGS. 2 and 3. An example of reference signal configurations repeated in frequency is provided in at least FIGS. 2 and 5. According to some of the example embodiments, the plurality of reference signal configurations comprise CSI-RS and/or BRS.

Operation 34

The transmit beam formation logic 105 further receives 34, from the receive beam formation logic, a feedback message comprising a recommended transmitting beam formation of the at least two distinct transmitting beam formations. The recommended transmitting beam formation is matched to a receiving beam formation for communications between the transmitter and the receiver. The receiving circuitry 107 or processing circuitry 111 receives, from the receive beam formation logic 205, the feedback message comprising the recommended transmitting beam formation of the at least two distinct transmitting beam formations. Operation 34 is further described under at least the subheading 'Recommended Beam Formation and Feedback Messaging'.

According to some of the example embodiments, the feedback message comprises a rank indicator, CQI, and/or PMI for the recommended transmitting beam formation.

According to some of the example embodiments, the feedback message comprises a prescribed number of recommended transmitting beam formations for communications between the transmitter and the receiver. For example, the receiver or receive beam formation logic may further recommend how many transmission beams should be used simultaneously for communications between the transmitter and receiver.

Working Examples: Further example embodiments are provided according to the following numbered examples:

Example 1A: Example 1A includes a receive beam formation logic, for use in a receiver, for beam formation matching for communications between the receiver and a transmitter in a multiple beam Multiple Input Multiple Output (MIMO) system. The receive beam formation logic comprises receive logic to receive, from a transmit beam formation logic for use in the transmitter, beam formation identification information for at least two distinct transmitting beam formations. The receive beam formation logic also comprises processing circuitry to determine at least two distinct receiving beam formations based on the beam formation identification information. The receiving beam formation logic further comprises receive logic to receive, from the transmit beam formation logic, a plurality of reference signal configurations using different combinations of the at least two distinct transmitting and receiving beam formations.

The processing circuitry determines channel conditions for each of the different combinations of the at least two distinct transmitting and receiving beam formations. Furthermore, the processing circuitry determines a recommended transmitting and receiving beam formation, of the at least two distinct transmitting and receiving beam formations, respectively, based on the determined channel conditions. The receive beam formation logic further comprises sending circuitry to output, to the transmit beam formation logic, a feedback message comprising the recommended transmitting beam formation, wherein said recommended transmitting and receiving beam formations are matched for communications between the transmitter and the receiver.

Example 1: Example 1 includes a receive beam formation logic, for use in a wireless receiver, in a multiple beam MIMO system comprising processing circuitry to process channel conditions of a plurality of reference signal configurations received in each of a plurality of different combinations of at least two distinct transmitting and receiving beam formations to determine a recommended transmitting and receiving beam formation for communications between the wireless receiver and a transmitter of the multiple beam MIMO system.

Example 2: In Example 2, the subject matter of Example 1 or any of the Examples described herein may further comprise at least one reference signal configuration is repeated in time and/or frequency.

Example 3: In Example 3, the subject matter of any of Examples 1-2 or any of the Examples described herein may further comprise the processing circuitry to process received beam formation identification information comprising any one or more of (1) a number of distinct transmitting beam formations, (2) a number of beams at each of the transmitting beam formations, (3) one or more beam identifiers for each of the transmitting beam formations, (4) frequency-time structure of reference signal configurations, and (5) an indication of a mapping of each transmitting beam formation to a frequency-time block of a reference signal configurations taken jointly and severally in any and all permutations.

Example 4: In Example 4, the subject matter of any of Examples 1-3 or any of the Examples described herein may further comprise at least a subset of received beam formation identification information being provided in a Downlink Control Information (DCI) message, an Uplink Control Information (UCI) message, or Radio Resource Control (RRC) signalling.

Example 5: In Example 5, the subject matter of any of Examples 1-4 or any of the Examples described herein may further comprise the plurality of reference signal configurations comprising Channel State Information—Reference Signals (CSI-RS) and/or Beamforming Reference Signals (BRS).

Example 6: In Example 6, the subject matter of any of Examples 1-5 or any of the Examples described herein may further comprise the processing circuitry being further configured to determine the at least two distinct receiving beam formations via a data retrieval from a receiver maintained beam database, said beam database comprising a receiving beam formation for a given transmitting beam formation.

Example 7: In Example 7, the subject matter of any of Examples 1-6 or any of the Examples described herein may further comprise at least one of the determined channel conditions being received signal strength, the processing circuitry to determine the recommended transmitting and receiving beam formation as the combination of the receiving and transmitting beam formation corresponding to a highest determined received signal strength or a determined received signal strength above a signal threshold.

Example 8: In Example 8, the subject matter of any of Examples 1-7 or any of the Examples described herein may further comprise the processing circuitry to send, to the transmitter, a feedback message comprising the comprising the recommended transmitting beam formation, the feedback message further comprising a number of (or an identification of) a recommended number of recommended transmitting beam formations for communications between the transmitter and the receiver.

Example 9: In Example 9, the subject matter of any of Examples 1-8 or any of the Examples described herein may further comprise the processing circuitry to send, to the transmitter, a feedback message comprising the comprising the recommended transmitting beam formation, the feedback message further comprising a rank indicator, Channel Quality Indicator (CQI) and/or a Pre-coding Matrix Indicator (PMI), taken jointly and severally in any and all permutations, for the recommended transmitting beam formation.

Example 10: In Example 10, the subject matter of any of Examples 1-9 or any of the Examples described herein may further comprise a transmitter and receiver communication pair comprising a base station and a user equipment, a first user equipment and a second user equipment, a base station and a wireless relay node, or a macro base station and a pico base station.

Example 11A: Example 11A includes a transmit beam formation logic, for use in a transmitter, for beam formation matching for communications between the transmitter and a receiver in a multiple beam Multiple Input Multiple Output (MIMO) system. The transmission beam formation logic comprises sending circuitry to send, to a receive beam formation logic for use in the receiver, beam formation identification information for at least two distinct transmitting beam formations. The sending circuitry to send, to the receive beam formation logic, a plurality of reference signal configurations in the at least two distinct transmitting beam formations for testing channel conditions for the at least two distinct transmitting beam formations.

The transmit beam formation logic further comprises receive logic to receive, from the receive beam formation logic, a feedback message comprising a recommended transmitting beam formation of the at least two distinct transmitting beam formations, wherein said recommended transmitting beam formation is matched to a receiving beam formation for communications between the transmitter and the receiver.

Example 11: Example 11 includes a transmit beam formation logic, for use in a transmitter, in a multiple beam MIMO system comprising processing circuitry. The processing circuitry to send, to a receiving beam formation unit for use in a receiver, a plurality of reference signal configurations in at least two distinct transmitting beam formations. The processing circuitry further to receive, from the receiving beam formation unit, a feedback message comprising a recommended transmitting beam formation of the at least two distinct transmitting beam formations, wherein the recommended transmitting beam formation is matched to a receiving beam formation for communications between the transmitter and the receiver.

Example 12: In Example 12, the subject matter of Examples 11 or any of the Examples described herein may further comprise at least one reference signal configuration is repeated in time and/or frequency.

Example 13: In Example 13, the subject matter of any of Examples 11-12 or any of the Examples described herein may further comprise the processing circuitry to send beam formation identification information comprising any one or more of (1) a number of distinct transmitting beam formations, (2) a number of beams at each of the transmitting beam formations, (3) one or more beam identifiers for each of the transmitting beam formations, (4) frequency-time structure of reference signal configurations, and (5) an indication of a mapping of each transmitting beam formation to a frequency-time block of a reference signal configuration taken jointly and severally in any and all permutations.

Example 14: In Example 14, the subject matter of any of Examples 11-13 or any of the Examples described herein may further comprise the processing circuitry to send beam formation identification information, at least a subset of the beam formation identification information is provided in a Downlink Control Information (DCI) message, an Uplink Control Information (UCI) message, or Radio Resource Control (RRC) signalling.

Example 15: In Example 15, the subject matter of any of Examples 11-14 or any of the Examples described herein may further comprise the plurality of reference signal configurations comprising CSI-RS and/or BRS.

Example 16: In Example 16, the subject matter of any of Examples 11-15 or any of the Examples described herein may further comprise the feedback message further comprising a number of (or an identification of) a recommended number of recommended transmitting beam formations for communications between the transmitter and the receiver.

Example 17: In Example 17, the subject matter of any of Examples 11-16 or any of the Examples described herein may further comprise the feedback message further comprising a rank indicator, CQI, and/or a PMI, taken jointly and severally in any and all permutations, for the recommended transmitting beam formation.

Example 18: In Example 18, the subject matter of any of Examples 11-17 or any of the Examples described herein may further comprise a transmitter and receiver communication pair comprising a base station and a user equipment, a first user equipment and a second user equipment, a base station and a wireless relay node, or a macro base station and a pico base station.

Example 19: Example 19 includes a wireless receiver, comprising a receive beam formation logic, for beam formation matching for communications for communications between the receiver and a transmitter in a multiple beam MIMO system. The wireless receiver comprises a touchscreen configured to receive input from a user for processing by the wireless receiver. The wireless receiver further comprises receive logic to receive, from a transmit beam formation logic for use in the transmitter, beam formation identification information for at least two distinct transmitting beam formations. The wireless receiver further comprises processing circuitry to determine at least two distinct receiving beam formations based on the beam formation identification information.

The receive logic receives, from the transmit beam formation logic, a plurality of reference signal configurations using different combinations of the at least two distinct transmitting and receiving beam formations. The processing circuitry determines channel conditions for each of the different combinations of the at least two distinct transmitting and receiving beam formations. The processing circuitry determines a recommended transmitting and receiving beam formation, of the at least two distinct transmitting and receiving beam formations, respectively, based on the determined channel conditions.

The wireless receiver further comprises sending circuitry to send, to the transmit beam formation logic, a feedback message comprising the recommended transmitting beam formation, wherein said recommended transmitting and receiving beam formations are matched for communications between the transmitter and the receiver.

Example 19A: In Example 19A, the subject matter of Example 19 or any of the Examples described herein may further comprises at least one reference signal configuration is repeated in time and/or frequency.

Example 20: Example 20 includes a computer-readable storing machine comprising executable instructions such that when executed by a receive beam formation logic cause the receive beam formation logic to receive, from a transmit beam formation logic for use in the transmitter, beam formation identification information for at least two distinct transmitting beam formations. The receive beam formation logic is also caused to determine at least two distinct receiving beam formations based on the beam formation identification information. The receive beam formation logic is further caused to receive, from the transmit beam formation logic, a plurality of reference signal configurations using different combinations of the at least two distinct transmitting and receiving beam formations.

The receive beam formation logic is also caused to determine channel conditions for each of the different combinations of the at least two distinct transmitting and receiving beam formations. The receive beam formation logic is further caused to determine a recommended transmitting and receiving beam formation, of the at least two distinct transmitting and receiving beam formations, respectively, based on the determined channel conditions. The receive beam formation logic is additionally caused to send, to the transmit beam formation logic, a feedback message comprising the recommended transmitting beam formation, wherein said recommended transmitting and receiving beam formations are matched for communications between the transmitter and the receiver.

Example 21: In Example 21, the subject matter of Example 20 or any of the Examples described herein may further comprises at least one reference signal configuration is repeated in time and/or frequency.

Example 22: In Example 22, the subject matter of any of Examples 20-21 or any of the Examples described herein may further comprise the beam formation information comprising any one or more of (1) a number of distinct transmitting beam formations, (2) a number of beams at each of the transmitting beam formations, (3) one or more beam identifiers for each of the transmitting beam formations, (4) frequency-time structure of reference signal configurations, and (5) an indication of a mapping of each transmitting beam formation to a frequency-time block of a reference signal configuration, taken jointly and severally in any and all permutations.

Example 23: In Example 23, the subject matter of any of Examples 20-22 or any of the Examples described herein may further comprise the plurality of reference signal configurations comprising CSI-RS and/or BRS.

Example 24: Example 24 includes a computer-readable storing machine comprising executable instructions such that when executed by a transmit beam formation logic cause the transmit beam formation logic to send, to a receive beam formation logic for use in the receiver, beam formation identification information for at least two distinct transmitting beam formations. The transmit beam formation logic is further caused to send, to the receive beam formation logic, a plurality of reference signal configurations in the at least two distinct transmitting beam formations for testing channel conditions for the at least two distinct transmitting beam formations. The transmit beam formation logic is also caused to receive, from the receive beam formation logic, a feedback message comprising a recommended transmitting beam formation of the at least two distinct transmitting beam formations, wherein said recommended transmitting beam formation is matched to a receiving beam formation for communications between the transmitter and the receiver.

Example 25: In Example 25, the subject matter of Example 24 or any of the Examples described herein may further comprise at least one reference signal configuration being repeated in time and/or frequency.

Example 26: In Example 26, the subject matter of any of Examples 24-25 or any of the Examples described herein may further comprise the beam formation information comprising any one or more of (1) a number of distinct transmitting beam formations, (2) a number of beams at each of the transmitting beam formations, (3) one or more beam identifiers for each of the transmitting beam formations, (4) frequency-time structure of reference signal configurations, and (5) an indication of a mapping of each transmitting beam formation to a frequency-time block of a reference signal configuration taken jointly and severally in any and all permutations.

Example 27: In Example 27, the subject matter of any of Examples 24-26 or any of the Examples described herein may further comprise the plurality of reference signal configurations comprising CSI-RS and/or BRS.

Example 28: Example 28 includes a method, in a receive beam formation logic, for beam formation matching form communications between a receiver and a transmitter in a multiple beam MIMO system. The method comprises receiving, from a transmit beam formation logic for use in the transmitter, beam formation identification information for at least two distinct transmitting beam formations. The method further comprises determining at least two distinct receiving beam formations based on the beam formation identification information. The method also comprises receiving, from the transmit beam formation logic, a plurality of reference signal configurations using different combinations of the at least two distinct transmitting and receiving beam formations. The method additionally comprises determining channel conditions for each of the different combinations of the at least two distinct transmitting and receiving beam formations.

The method also comprises determining a recommended transmitting and receiving beam formation of the at least two distinct transmitting and receiving beam formations, respectively, based on the determined channel conditions. The method further comprises sending, to the transmit beam formation logic, a feedback message comprising the recommended transmitting beam formation, wherein said recommended transmitting and receiving beam formations are matched for communications between the transmitter and the receiver.

Example 28A: In Example 28A, the subject matter of Example 28 or any of the Examples described herein may further comprise at least one reference signal configuration is repeated in time and/or frequency.

Example 29: Example 29 includes a method, in a transmit beam formation logic, for beam formation matching form communications between the transmitter and a receiver in a multiple beam MIMO system. The method comprises sending, to a receive beam formation logic for use in the receiver, beam formation identification information for at least two distinct transmitting beam formations. The method also comprises sending, to the receive beam formation logic, a plurality of reference signal configurations in the at least two distinct transmitting beam formations for testing channel conditions for the at least two distinct transmitting beam formations. The method further comprises receiving, from the receive beam formation logic, a feedback message comprising a recommended transmitting beam formation of the at least two distinct transmitting beam formations, wherein said recommended transmitting beam formation is matched to a receiving beam formation for communications between the transmitter and the receiver.

Example 29A: In Example 29A, the subject matter of Example 29 or any of the Examples described herein may further comprises at least one reference signal configuration is repeated in time and/or frequency.

Example 30: Example 30 includes a receiver comprising the receive beam formation logic of any of Examples 1-10 or any other Example described herein.

Example 31: Example 31 includes a transmitter comprising the transmit beam formation logic of any of Examples 11-18 or any other Example described herein.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, of the embodiments are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A processor of a user equipment (UE) configured to perform operations, comprising:
    receiving reference signal configurations, each reference signal configuration corresponding to one transmitter beam;
    receiving beam identification information comprising an indication that at least one reference signal configuration is repeated in time using a same transmitter beam;
    selecting a transmitter beam based on at least received reference signals corresponding to the reference signal configurations; and
    transmitting a message comprising an indication of the selected transmitter beam to a base station.

2. The processor of claim 1, wherein the indication of the selected transmitter beam comprises an indication of a CSI-reference signal (CSI-RS) received by the UE.

3. The processor of claim 1, wherein the reference signal configurations and the beam identification information is received in a same message.

4. The processor of claim 1, wherein the operations further comprise:
    determining, prior to the selecting the transmitter beam, a parameter associated with each of the transmitter beams, wherein selecting the transmitter beam is further based on the parameter.

5. The processor of claim 4, wherein the parameter is one of a reference signal received power (RSRP) or a signal interference to noise ratio (SINR).

6. The processor of claim 1, wherein the operations further comprise:
    receiving control information comprising an indication of a type of channel state information (CSI) reporting configuration, wherein the message is a CSI report generated in accordance with the CSI reporting configuration.

7. A user equipment (UE), comprising:
    radio frequency (RF) circuitry configured to communicate with a network; and
    a processor communicatively coupled to the RF circuitry and configured to perform operations comprising:
        receiving reference signal configurations, each reference signal configuration corresponding to one transmitter beam;
        receiving beam identification information comprising an indication that at least one reference signal configuration is repeated in time using a same transmitter beam;
        selecting a transmitter beam based on at least received reference signals corresponding to the reference signal configurations; and
        transmitting a message comprising an indication of the selected transmitter beam to a base station.

8. The UE of claim 7, wherein the indication of the selected transmitter beam comprises an indication of a CSI-reference signal (CSI-RS) received by the UE.

9. The UE of claim 7, wherein the operations further comprise:
    determining, prior to the selecting the transmitter beam, a parameter associated with each of the transmitter beams, wherein selecting the transmitter beam is further based on the parameter.

10. The UE of claim 9, wherein the parameter is reference signal received power (RSRP).

11. The UE of claim 9, wherein the parameter is signal interference to noise ratio (SINR).

12. The UE of claim 7, wherein the operations further comprise:
    receiving control information comprising an indication of a type of channel state information (CSI) reporting configuration, wherein the message is a CSI report generated in accordance with the CSI reporting configuration.

13. One or more non-transitory computer-readable media comprising instructions to cause an electronic device, upon execution of the instructions by one or more processors of the electronic device, to perform operations, comprising:
    receiving reference signal configurations, each reference signal configuration corresponding to one transmitter beam;
    receiving beam identification information comprising an indication that at least one reference signal configuration is repeated in time using a same transmitter beam;
    selecting a transmitter beam based on at least received reference signals corresponding to the reference signal configurations; and
    transmitting a message comprising an indication of the selected transmitter beam to a base station.

14. The non-transitory computer readable media of claim 13, wherein the indication of the selected transmitting beam comprises an indication of a CSI-reference signal (CSI-RS).

15. The non-transitory computer readable media of claim 13, wherein the operations further comprise:
    determining, prior to the selecting the transmitter beam, a parameter associated with each of the transmitter beams, wherein selecting the transmitter beam is further based on the parameter.

16. The non-transitory computer readable media of claim 15, wherein the parameter is one of reference signal received power (RSRP) or signal interference to noise ratio (SINR).

17. The non-transitory computer readable media of claim 13, the operations further comprising:
    receiving control information comprising an indication of a type of channel state information (CSI) reporting configuration, wherein the message is a CSI report generated in accordance with the CSI reporting configuration.

\* \* \* \* \*

UNITED STATES PATENT AND TRADEMARK OFFICE
CERTIFICATE OF CORRECTION

PATENT NO. : 11,342,974 B2
APPLICATION NO. : 17/247416
DATED : May 24, 2022
INVENTOR(S) : Hwang et al.

Page 1 of 1

It is certified that error appears in the above-identified patent and that said Letters Patent is hereby corrected as shown below:

On the Title Page

Related U.S. Application Data item (63):
"Continuation of application number 16/082,365, filed as application No. PCT/US2016/078444 on April 5, 2016, now Patent No. 10,868,596." should read as "Continuation of application number 16/082,365, filed on September 5, 2018, now patent 10,868,596; which is a 371 of PCT/US2016/078444, filed on April 5, 2016".

Signed and Sealed this
Thirtieth Day of August, 2022

Katherine Kelly Vidal
*Director of the United States Patent and Trademark Office*